Patented Mar. 24, 1931

1,797,833

UNITED STATES PATENT OFFICE

BERT H. McQUEER, OF FOSTORIA, OHIO, ASSIGNOR TO NATIONAL CARBON COMPANY, INC., A CORPORATION OF NEW YORK

BEARING

No Drawing.     Application filed August 12, 1929. Serial No. 385,476.

The invention relates to bearings, and it is especially concerned with antifriction devices which require little or no lubrication.

The ability of a bearing to operate without lubrication becomes particularly advantageous when the bearing is not readily accessible, or is exposed to high temperatures or to substances reactive with lubricants; or when the bearing forms part of a machine operating on materials which would be damaged by contact with oil or grease. The bearings of my invention are useful in such places as well as in places where lubricated bearings are ordinarily used. An important field of use is in the declutching mechanism of automobiles.

Prior unlubricated bearings have generally employed a composite member containing graphite, or initially impregnated with oil. It is difficult to incorporate the required proportion of graphite into such a composite member without making the latter unduly soft and liable to wear, while bearings impregnated with oil or grease tend to exude their lubricant.

The bearings of my invention utilize a carbonaceous base, but it is not necessary that this base contain any unctuous substance, either graphitic or oleaginous. On the contrary the carbonaceous base may be a coke-like composition of considerable hardness, like the stock used for arc lamp and arc welding electrodes.

Antifriction properties are imparted to the carbonaceous base my incorporating a boron compound. Boric acid or borates may be used, but the cheapest boron compound, borax, gives satisfactory results, and is accordingly preferred. Proportions of borax from a fraction of one percent up to twenty percent or more give the desired action, the lower contents being preferred.

I am unable to explain how the boron compound acts to confer antifriction properties on the carbonaceous base, but its influence is readily apparent. A common form of declutching bearing consists of a carbonaceous ring arranged to be moved by a pedal into contact with a metal plate connected with one of the coacting clutch members in such manner as to move the said clutch member against the tension of the clutch spring and thus to release the clutch. Friction is developed between the carbonaceous ring and the opposed plate, due to the fact that the latter rotates at engine speed while the ring is angularly stationary. In a test which has been prescribed for the testing of declutching bearing rings a machine is used which simulates the conditions under which a declutching bearing operates in an automobile. The test consists in holding the clutch in fully released position for thirty minutes, with the driven side of the clutch rotating at 900 to 1000 R. P. M. and a pressure of 200 to 350 pounds per square inch on the declutching bearing surface. Under these test conditions the temperature of bearings made in accordance with my invention does not usually rise above about 125° C., indicating a low coefficient of friction. Exactly similar rings containing no boron compound usually become red-hot in five minutes. Another test, carried out with the same pressure and speed of rotation, consists in completely releasing the clutch 100,000 times at the rate of 18 declutchings per minute, and then measuring the wear on the bearing. Borax-impregnated carbonaceous rings can easily be made which show wear well below the limit of 0.025 inches specified by leading manufacturers of automobiles and clutches.

Acceptable bearings can be made with a variety of carbonaceous compositions. Graphite may be included, but a hard stock containing little or no graphite is preferred because of its lower rate of wear. Merely by way of example, I refer to a method of preparing a satisfactory stock, which is also suitable for making arc electrodes. One hundred pounds of finely ground petroleum coke are mixed with 45 pounds of standard 25% residue hard pitch for one hour in a mixer heated to 170° C. The mixture is cooled and milled to pass a 35 mesh screen. The powdered mix is molded and baked at 1400° C.

The borax or other boron compound may be admixed with the coke and pitch before the rings are fabricated, but I prefer to prepare the stock in the normal way, machine the rings from the stock, and finally impregnate the rings with a solution of boric acid or a borate, and dry. The stock is porous, and since only a small content of boron compound is required, the impregnation involves no difficulty. It may be carried out, for example, by heating the rings slightly above 100° C. and then introducing them into a boiling solution of borax of any convenient concentration, (say 15%), removing the rings after a time which may vary from a few minutes to two hours or more, and drying. The drying temperature is not critical. Temperatures as low as 105° C. and as high as 350° C. or more have been used with good results. The surface of the finished rings may be cleaned to improve their appearance.

When, in the friction or heating test described above, the temperature of a boron-containing carbon ring does not rapidly rise above 100° C. the ring will be found to have acquired a glossy bearing surface. This seems to be formed by a minute quantity of fine dust abraded from the ring and then taken into the pores of its wearing face. Rings capable of giving acceptable service take on such a surface almost immediately, and are not likely thereafter to develop friction or to heat up. If the metal plate opposed to the ring is too highly polished, the carbon ring does not acquire a glossy surface so readily, and it is preferred to use plates which have only been coarsely polished. Rings which in the first few minutes of use develop a scuffed appearance instead of a gloss are unsatisfactory.

In some cases rings believed to be of proper composition have developed high friction under test conditions, and have failed to take a glossy bearing surface as described above. I ascribe this to an unduly desiccated condition of the ring, and find that it is most likely to occur when the rings are tested soon after drying, without intervening exposure to moist air. It has been found that the difficulty can be avoided by storing the rings for a time in a moist atmosphere before using them, and it is my present belief that when they have come to equilibrium with moist air, they will not thereafter become unduly desiccated by exposure to dry air. In practice the matter is perhaps of no great importance because of the probability that the rings will, before use, become humidified by contact with air of sufficient moisture content, but as a precaution I prefer to treat the rings with a small quantity of a hygroscopic substance, for example a glycol, glycerine or other polyhydric alcohol. There is no reason to believe that such alcohol serves as a lubricant, since satisfactory rings can be prepared without the alcohols, provided undue desiccation of the bearings is prevented. A very small proportion of glycol or the like insures a sufficient moisture content in the bearing. I prefer to add a few percent of ethylene glycol to the impregnating bath, and to dry at a relatively low temperature, but it is obvious that a hygroscopic substance can be applied in many other ways.

Having now described my invention, what I claim is:

1. A bearing member comprising carbonaceous material and a boron compound.
2. A bearing member comprising coke and a boron compound.
3. A bearing member comprising petroleum coke and borax.
4. A bearing member comprising carbonaceous material, a boron compound, and a polyhydric alcohol.
5. A bearing member comprising coke, a boron compound, and a glycol.

In testimony whereof, I affix my signature.

BERT H. McQUEER.